United States Patent [19]

Kuramochi et al.

[11] 4,148,229
[45] Apr. 10, 1979

[54] OVERDRIVE DEVICE FOR AUTOMATIC TRANSMISSION

[75] Inventors: Koujiro Kuramochi; Kazuaki Watanabe; Yukio Terakura, all of Aichi, Japan

[73] Assignee: Toyota Jidosha Kogyo Kabushiki Kaisha, Aichi, Japan

[21] Appl. No.: 821,077

[22] Filed: Aug. 2, 1977

[30] Foreign Application Priority Data

Apr. 5, 1977 [JP] Japan .................................. 52-38145

[51] Int. Cl.² ............................................. F16H 1/28
[52] U.S. Cl. ........................................ 74/801; 74/467; 184/6.12
[58] Field of Search .................... 74/781 R, 467, 801; 184/6.12

[56] References Cited

U.S. PATENT DOCUMENTS

| 2,408,336 | 9/1946 | Orr | 184/6 |
|---|---|---|---|
| 2,599,215 | 6/1952 | Wemp | 74/781 R |
| 3,583,526 | 6/1971 | Mulleder et al. | 184/6 |
| 3,821,908 | 7/1974 | Marsch et al. | 74/801 |
| 4,043,223 | 8/1977 | Ohnuma et al. | 74/688 |

*Primary Examiner*—Samuel Scott
*Assistant Examiner*—James Yates
*Attorney, Agent, or Firm*—Toren, McGeady and Stanger

[57] ABSTRACT

An overdrive device including an input shaft coupled to a fluid-coupling type torque converter, an output shaft coupled to a plurality of auxiliary transmissions each having one or more reduction gear ratios, and planet pinions which are supported by pinion shafts through the medium of two or more needle bearings positioned in a side-by-side relationship in the axial direction of the pinion shafts thereon, and maintained in mesh with a sun gear and a ring gear. The pinion shafts include lubricating oil passages running therethrough, respectively, thereby feeding lubricating oil to the needle bearings at a given pressure. The overdrive device is positioned between the fluid-coupling type torque converter and the auxiliary transmission, so that the size of the automatic transmission is reduced.

1 Claim, 2 Drawing Figures

OVERDRIVE DEVICE FOR AUTOMATIC TRANSMISSION

BACKGROUND OF THE INVENTION

The present invention relates to an overdrive device for use in an automatic transmission in a motor vehicle.

There has arisen a demand for an automobile transmission which may establish a reduction gear ratio of less than 1 (overdrive). Several purposes may be served by such a transmission. They may include: reducing the amount of harmful constituents of exhaust gases from the engine; improving the high speed running performance of a vehicle on a road such as a freeway; and reducing noise during the operation of the engine.

An overdrive gear position in an automatic transmission, in which the torque from the engine crank shaft is automatically converted commensurate with the running condition of the motor vehicle for transmission of the torque to the drive wheels, may be achieved by means of one or more auxiliary transmissions establishing two or more reduction gear ratios, respectively, in addition to an overdrive device providing a reduction gear ratio of less than 1.

In general, it has been a common practice in design of automatic transmissions with an overdrive device, that a minimum reduction gear ratio be used most frequently, with the result that the gear ratio corresponding to an overdrive is used most frequently. The overdrive device includes planet pinions, a sun gear in mesh with the planet pinions, and a ring gear coupled to an output shaft and meshing with the planet pinions. Thus, upon establishing the overdrive gear position, the sun gear is fixed, while the planet pinions revolve around the sun gear, turning on their axes, thereby rotating the ring gear. In other words, unlike the solid coupling of an input shaft to an output shaft, there results differences in r.p.m. among respective components of the overdrive device.

For instance, assuming a number of teeth $Z_s$ of a sun gear, a number of teeth $Z_p$ of a planet pinion, and an r.p.m. C of a carrier, then the difference in r.p.m. is given as $Z_s/Z_p \times C$. A needle bearing is disposed between each planet pinion and pinion shaft in a carrier so as to rotatably support the planet pinion thereon. In this respect, moments in opposing directions are produced by the sun gear and ring gear due to an inclination of the teeth of each gear, so that a normal force in the axial direction acts outwardly on each needle in a needle bearing.

On the other hand, tangential forces in the direction of a rotating carrier are applied between the sun gear and the planet pinions and between the planet pinions and the ring gear, so that a force in the direction of the rotating carrier acts on each needle in the bearing. As a result, a resultant force derived from a normal force and a tangential force acting on each needle is concentrated on the opposite ends of each needle. This leads to skew and deformation in the needle bearing, thereby shortening the service life thereof.

In addition, the skew and deformation thus caused in the needle bearing in turn cause planet pinions to produce a thrust, thereby accelerating wear of thrust washers positioned between a carrier and planet pinions.

Furthermore, a large difference in r.p.m. among the aforementioned gears then produces a considerable quantity of heat in the needle bearings, while the skew and deformation of the needle bearings leads to an additional increase in the quantity of heat thus produced. Heat is produced at meshing points of respective gears in an overdrive gear position, as well. The heat caused due to the foregoing various reasons lowers the durability of elements incorporated in the needle bearings, and results in lowered performance thereof.

Accordingly, the present invention is directed toward provision of an overdrive device for use in an automatic transmission which improves the durability of the needle bearings.

Furthermore, the invention is intended to provide an overdrive device of the type which may reduce the size of an automatic transmission.

SUMMARY OF THE INVENTION

According to the present invention, there is provided an overdrive device for use in an automatic transmission, which comprises an input shaft coupled to a fluid-coupling type torque converter, an output shaft coupled to a plurality of auxiliary transmissions each having one or more reduction gear ratios, and planet pinions which are supported by pinion shafts through the medium of a plurality of needle bearings positioned in side-by-side relationship in the axial direction of the pinion shafts, and maintained in mesh with a sun gear and a ring gear.

According to another aspect of the present invention, the pinion shafts include lubricating oil passages running therethrough for feeding lubricating oil to the needle bearings at a given pressure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
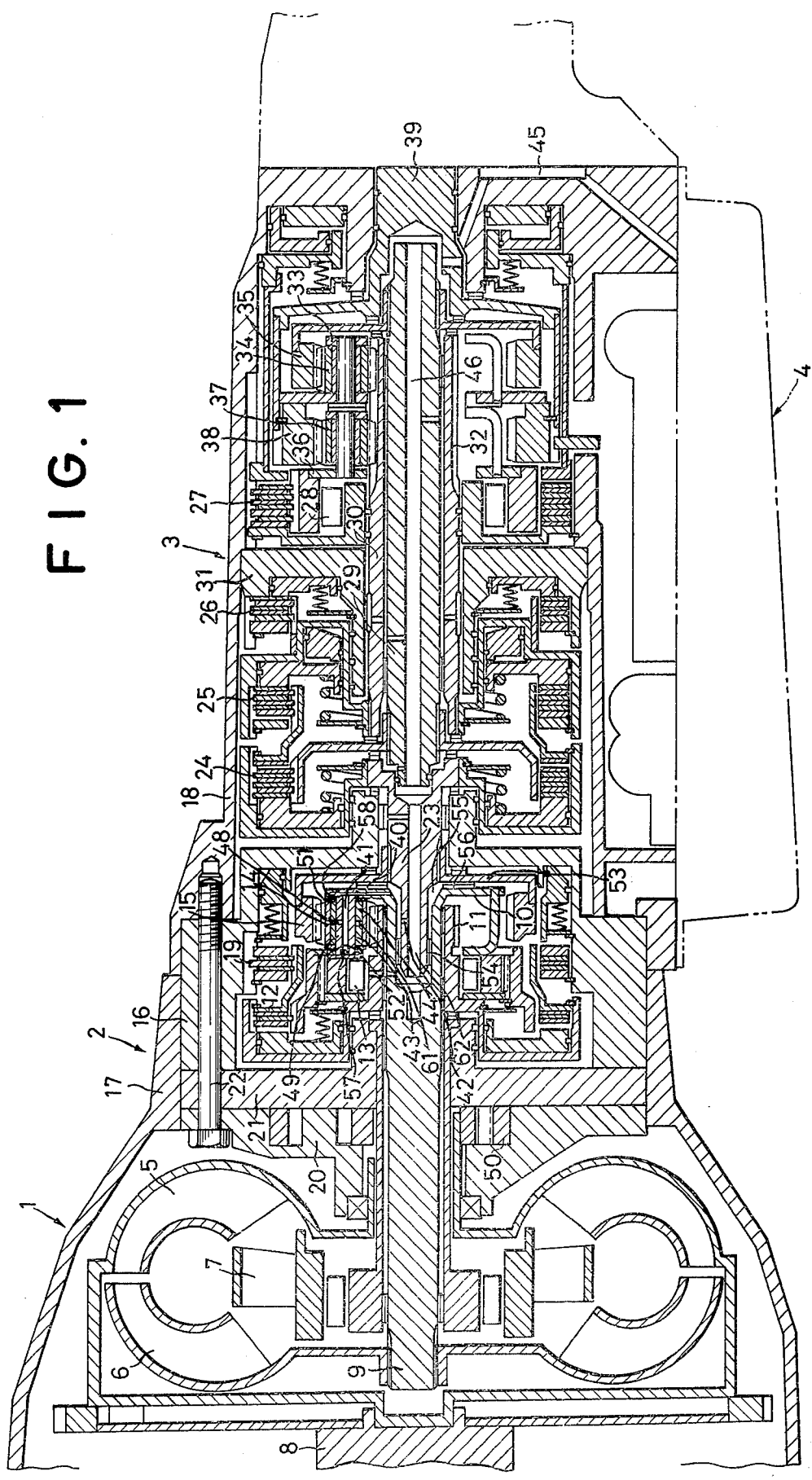
FIG. 1 is a longitudinal cross-sectional view of an automatic transmission incorporating an overdrive device according to the present invention.
Figure 2:
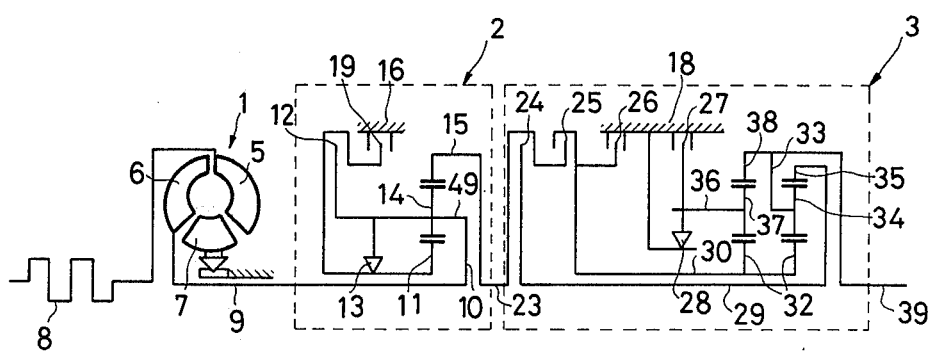
FIG. 2 is a diagram illustrating the engagement of respective components of the automatic transmission of FIG. 1.

Referring to FIGS. 1 and 2, an automatic transmission is shown which includes a torque converter 1, an overdrive device 2, a three-forward-speed-and-one-reverse auxiliary transmission 3, and a hydraulic control portion 4. The torque converter 1 is of a known type in which there are provided a pump 5, turbine 6 and starter 7. The pump 5 is coupled to a crank shaft 8 of an engine (not shown), while the turbine 6 is coupled to a turbine shaft 9. The turbine shaft 9 serves as an output shaft for the torque converter 1, and as an input shaft for the overdrive device 2, being coupled to a carrier 10 in a planetary gear device.

Pinion shafts 49 are secured to the carrier in an integral fashion, while two needle bearings 43, 44 are fitted on each of the pinion shafts 49 in a side-by-side relationship in the axial direction of the pinion shaft 49, being spaced apart one from the other. Planet pinions 14 are rotatably supported on pinion shafts 49 through the intermediary of the needle bearings 43,44. In addition, thrust washers 51, 52 are positioned between the carrier 10 and planet pinions 14, thereby preventing the displacement of the planet pinions 14 in the axial direction of the pinions 14.

Spacer 61 is interposed between needle bearings 43, 44 to maintain an axial spacing between one needle bearing and the other. The planet pinions 14 mesh with the sun gear 11 and ring gear 15. A thrust washer 56 is provided between the turbine shaft 9 and a flange of the ring gear 15 to eliminate displacement of the turbine shaft 9 towards the flange 53 of the ring gear 15. Provided between the sun gear 11 and the carrier 10 are a multiple disc clutch 12 and a one-way clutch 13. In addition, a multiple disc brake 19 is provided between the sun gear 11 and a housing or overdrive casing 16 containing the overdrive device therein.

The torque converter 1 includes a housing 17 which contains the pump 5, turbine 6, stator 7 and the like therein. The auxiliary transmission 3 includes a housing or transmission casing 18 which contains a planetary gear mechanism, clutch and brake. The housing 17 and casing 18 are fastened together by means of bolts (not shown). The overdrive casing 16 is fastened to the transmission casing 18 by means of bolts 22, together with a housing containing an oil pump gear, or oil pump bodies 20, 21.

The flange 53 integral with the ring gear 15 in the overdrive device 2 is coupled to the input shaft 23 for the auxiliary transmission 3. The input shaft 23 is positioned in coaxial relation to the crank shaft 9, and the shafts 23, 9 may be rotated independently to each other, by the medium of a bearing 54. A multiple disc clutch 24 is provided between the input shaft 23 and an intermediate shaft 29, while a multiple disc clutch 25 is provided between the input shaft 23 and a sun gear shaft 30. A multiple disc brake 26 is provided between the sun gear shaft 30 and a support 31 secured to the transmission casing 18. The sun gear 32 fitted on the sun gear shaft 30 forms a two-row planetary gear device by the cooperation between a group composed of a carrier 33, planet pinion 34 carried by the carrier 33, and ring gear 35 meshing with the pinions 34, and another group composed of a carrier 36, planet pinions carried by the carrier 36, and a ring gear 38 meshing with the pinions 37.

The ring gear 35 in one planetary gear device is coupled to an intermediate shaft 29. The carrier 33 in the aforesaid one planetary gear device is coupled to the ring gear 38 in the other planetary gear device, while these carriers and ring gears are coupled to the output shaft 39. In addition, a multiple disc brake 27 and a one-way clutch 28 are provided between the carrier 36 and the transmission casing 18 in the other planetary gear device.

A hydraulic control device 4 is positioned under the auxiliary transmission 3 for effecting engagement or release of clutches and brakes by actuating change-over valves in the hydraulic control device, in response to vehicle speed and engine output, thus establishing four forward speed gear positions including overdrive (O.D.), or one reverse given by a manual operation.

Table 1 shows the change gear positions, and operations of clutches and brakes.

Table 1

| friction-engaging device shift position | | | clutch 12 | clutch 24 | clutch 25 | brake 19 | brake 26 | brake 27 | one-way clutch 13 | one-way clutch 28 |
|---|---|---|---|---|---|---|---|---|---|---|
| parking | | | O | X | X | X | X | O | | |
| reverse | | | O | X | O | X | X | O | lock | overrun |
| neutral | | | O | X | X | X | X | X | | |
| forward speed transmission position | D-range | 1st | O | O | X | X | X | X | lock | lock |
| | | 2nd | O | O | X | X | O | X | lock | overrun |
| | | 3rd | O | O | O | X | X | X | lock | overrun |
| | | O.d. | X | O | O | O | X | X | overrun | overrun |
| | 2-range | 1st | O | O | X | X | X | X | lock | lock |
| | | 2nd | O | O | X | X | O | X | lock | overrun |
| | L-range | | O | O | X | X | X | O | lock | lock |

(Note: O represents an engaging condition of a clutch or a brake and X represents a released condition thereof.)

An oil passage 45 is provided within the transmission casing 18 in the auxiliary transmission 3. Another oil passage 46 runs through the intermediate shaft 29 and communicates with the oil passage 45. An oil passage 62 runs through the input shaft 23 in communication with the oil passage 46. Thus, lubricating oil is pumped up and pressurized by an oil pump gear 50 built in oil pump bodies 20, 21, then adjusted for a given pressure in the hydraulic control portion 4, and supplied through oil passages 45, 46, and 62 to respective portions of the overdrive device 2 and auxiliary transmission 3.

According to the present invention, oil passages are provided in an attempt to supply lubricating oil to the needle bearings 43, 44. More particularly, an oil chamber 55 is defined by the turbine shaft 9, an input shaft 23 of the auxiliary transmission 3, flange 53 of the ring gear 15, bearing 54 and washer 56, and communicated through a hole 42 in the input shaft 23 with the oil passage 62. An oil passage 40 extending in the radial direction is provided within the carrier 10. The oil passage is communicated with the oil chamber 55 at a radially inner end thereof, and closed with a plug 58 at the radially outer end thereof. An oil passage 41 runs through the pinion shaft 49 along the axis thereof. The oil passage 41 is communicated with the oil passage 40 at one end, and cosed with a plug 57 at the other.*** An oil passage 48 is provided in the pinion shaft 49, running from the oil passage 41 in the radial direction outwardly. The oil passage 48 is open between the needle bearings 43 and 44. In this manner, lubricating oil at a given pressure is supplied to the needle bearing 43, 44 via hole 42, oil chamber 55, oil passage 40 and oil passage 41. The lubricating oil thus supplied lubricates and cools not only the needle bearings 43, 44 and thrust washers 51, 52, but also respective teeth of planet gears 14 and the ring gear.

*** The plug 57 is housed in an enlarged portion of lubricating oil passage, so that the plug 57 is inserted in the enlarged portion loosely. The lubricating oil passage is completely plugged with a thrust washer. The plug 58 is coaked into an end portion of the lubricating oil passage. If the plug 57 is not loosely inserted, then the planetary pinion pin will be deformed, thereby shortening the service life of the needle bearing.

As is apparent from the foregoing description of the overdrive device according to the present invention, two or more needle bearings 43, 44 are positioned in side-by side relationship in the axial direction of the pinion shafts 49 thereon, while the planet pinions 14 are rotatably supported by the pinion shafts 49 through the medium of the needle bearings 43, 44. As a result, two resultant forces acting on the opposite ends of each needle as in a single conventional needle bearing, respectively, in the prior art, are borne to two needle bearings 43, 44, separately but equally, so that skew and deformation of the needle bearing and mutual interference of respective gears may be prevented, with resulting improved durability of elements in the needle bearings.

In addition, lubricating oil may be supplied under a given pressure to gear-meshing portions and needle bearings, which form heat sources upon overdrive, so that these portions may be cooled with lubricating oil thereby extending the service lives of these members.

Success in prevention of a skew and deformation of needle bearings and supply of lubricating oil thereto leads to the improvements in durability of thrust washers 51, and 52, as well.

While a specific embodiment of the invention has been shown and described in detail to illustrate the application of the inventive principles, it will be understood that the invention may be embodied otherwise without departing from such principles.

What is claimed is:

1. An overdrive device for an automatic transmission of a motor vehicle comprising:
   a fluid coupling-type torque converter;
   an input shaft coupled to said torque converter;
   a plurality of auxiliary transmissions each having at least one reduction gear ratio;
   an output shaft coupled to said auxiliary transmissions;
   a carrier rotatably supporting planetary pinions through the medium of a plurality of pinion shafts and needle bearings positioned in side-by-side relationship provided in the axial direction of said input shaft;
   a spacer positioned between said needle bearings;
   a planetary gear including a sun gear and a ring gear meshing with said pinions rotatably supported in said carrier, with said sun gear concentric with said input shaft and with said ring gear coupled to said output shaft;
   a one-way clutch included between said carrier and said sun gear;
   hydraulic source means for supplying lubricating oil for said needle bearings;
   first lubricating oil passage means formed in said carrier in the radial direction of said output shaft communicating with said hydraulic source means and having one end closed with a plug;
   second lubricating oil passage means positioned inside said spacer communicating with said first lubricating oil passage means and formed in the axial direction of said pinions;
   third lubricating oil passage means communicating with said second lubricating oil passage means discharging lubricating oil to said bearings and having a diameter which at one end is enlarged to loosely receive a plug, with adjoining means being provided to prevent said plug from being removed therefrom; and
   hyraulic control means operating to control the pressure of said lubricating oil.

* * * * *